US005615297A

United States Patent [19]
Davis

[11] Patent Number: 5,615,297
[45] Date of Patent: Mar. 25, 1997

[54] TRANSMISSION SYSTEM FOR CODED SPEECH SIGNALS AND/OR VOICEBAND DATA

[75] Inventor: Andrew G. Davis, Little Bealings, England

[73] Assignee: British Telecommunications public limited company, London, England

[21] Appl. No.: 244,090

[22] PCT Filed: Nov. 13, 1992

[86] PCT No.: PCT/GB92/02102

§ 371 Date: Jun. 10, 1994

§ 102(e) Date: Jun. 10, 1994

[87] PCT Pub. No.: WO93/10623

PCT Pub. Date: May 27, 1993

[30] Foreign Application Priority Data

Nov. 15, 1991 [EP] European Pat. Off. ............... 9124331

[51] Int. Cl.$^6$ ............................ H04M 11/06; H04J 3/16; H04L 25/49

[52] U.S. Cl. ........................ 395/2.1; 395/2.42; 395/2.23; 371/49.1

[58] Field of Search .................................. 395/2.17, 2.19, 395/2.23, 2.24, 2.1, 2.42; 381/36, 39, 40; 371/48, 49.1, 49.2; 375/240, 241, 242

[56] References Cited

U.S. PATENT DOCUMENTS 4,876,696  10/1989  Yoshikawa ........................ 375/216

FOREIGN PATENT DOCUMENTS

| 0426336 | 10/1990 | European Pat. Off. . |
| 0426336A2 | 5/1991 | European Pat. Off. . |
| 2072733 | 3/1990 | Japan . |
| 3125525 | 5/1991 | Japan . |

OTHER PUBLICATIONS

Roberge et al, "Fast On–Line Speech/Voiceband–Data Discrimination for Statistical Multiplexing of Data with Telephone Conversations", IEEE Transactions on Communications, vol. COM–34, No. 8, Aug. 1986, (New York, US), pp. 744–751.

Casale et al, "A DSP Implemented Speech/Voiceband Data Discriminator", IEEE Global Telecommunications Conference & Exhibition, Hollywood, Florida, 28 Nov.–1 Dec. 1988, vol. 3, pp. 1419–1427.

Patent Abstracts of Japan, vol. 14, No. 252, (E–934), 30 May 1990 & JP A,02072733 (Fujitsu Ltd) 13 Mar. 1990.

Digital Communication by Edward A. Lee and David G. Messerschmitt, Kluwer, 1988, p. 602, Fig. 16–8.

*Primary Examiner*—Allen R. MacDonald
*Assistant Examiner*—Talivaldis Ivars Smits
*Attorney, Agent, or Firm*—Nixon & Vanderhye P.C.

[57] ABSTRACT

A digital coder receives either speech or audio-band data. When receiving speech this is coded by a digital speech coder and formatted into frames with parity bits. If modulated data are present this is recognized by a detector which routes the signals instead via a demodulator. Parity bits are generated from the same frame portions but parity is inverted so that a parity checking unit at a receiver can readily recognise the change. Preferably means are provided to insert into data frames codewords identifying the start and end and indicating the type of modulation in use. Additional detectors and demodulators can be added for different types of modulation. Such coded signals are decoded by performing parity checks on received frames to produce a parity indication signal of a first data mode sense or a second speech mode sense. In a data mode, the received signals modulated in accordance with a predetermined modulation scheme are provided as an output and in a speech mode the received signals are decoded to provide a speech output.

12 Claims, 1 Drawing Sheet

TRANSMISSION SYSTEM FOR CODED SPEECH SIGNALS AND/OR VOICEBAND DATA

FILED OF THE INVENTION

The present invention relates to apparatus for coding voice-band signals into digital form, and to apparatus for decoding such signals. More particularly the object is to provide a coder and decoder able to accommodate both speech signals and modulated data signals.

SUMMARY OF THE INVENTION

Thus the invention provides, in a first aspect, an audio-frequency coding apparatus comprising:

(a) an input for receiving audio frequency signals;

(b) a speech coder for coding the received signals into digital form;

(c) a demodulator for demodulating the received signals, in accordance with a predetermined modulation scheme;

(d) a recognizer operable to place the apparatus in a data or speech mode dependent on the presence or absence respectively of signals according to the predetermined modulation scheme;

(e) means for formatting signals from, in the data mode, the demodulator and from, in the speech mode, the speech coder, into a common framing structure; and (f) a parity generator responsive to a plurality of predetermined bit positions within the framing structure to generate parity bits and to insert these in predetermined positions within the framing structure, the sense of the parity bits when in the data mode being the reverse of that in the speech mode.

In another aspect of the invention there is provided an apparatus for decoding signals thus coded comprising:

(a) means for receiving frames of digital signals and for performing parity checks thereon to produce a parity pass/fail signal for each frame;

(b) control means responsive to the parity pass/fail signals to switch the apparatus between a data mode and a speech mode;

(c) a modulator operable in the data mode to modulate the received signals to provide a modulated signal to the output of the apparatus; and (d) speech decoding means operable in the speech mode to decode the received signals to provide a speech signal to the said output.

BRIEF DESCRIPTION OF THE DRAWINGS

Some embodiments of the invention will now be described, by way of example, with reference to the accompanying drawings, in which.

DETAILED DESCRIPTION OF THE DRAWINGS

Figure 1:
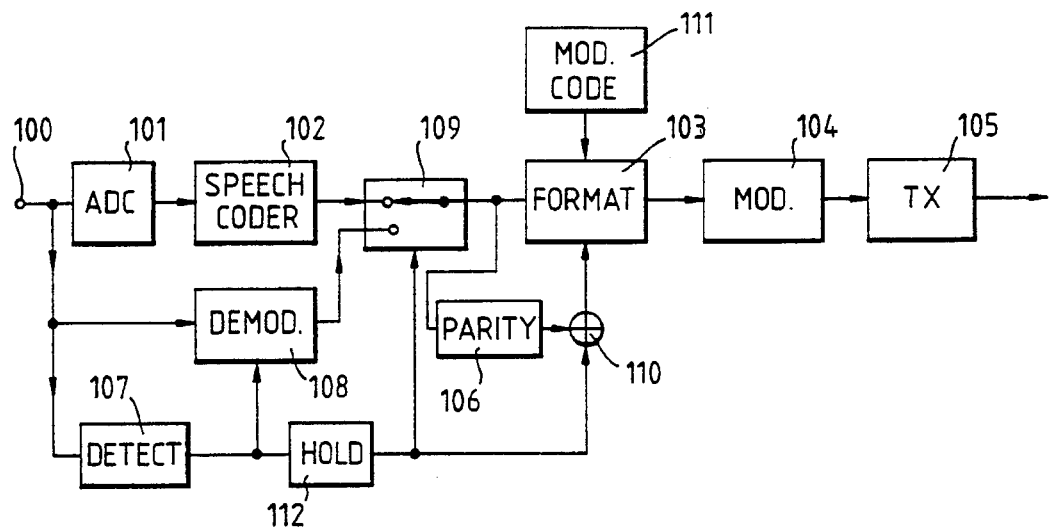
FIG. 1 is a block diagram of one form of voice-band coding apparatus in accordance with the invention.

Referring to FIG. 1, analogue voice-band signals received at an input 100 are sampled and converted to digital form in an analogue-to-digital converter 101, the output of which is supplied to the input of a speech coder 102. The speech coder can be any of various types of redundancy-reducing digital speech coder currently available, for example a multipulse-excited LPC coder. The output of the speech coder is supplied to a formatting unit 103 which formats the data with parity bits and framing information into a frame structure. The formatted data are fed to a modulator 104 to convert the signal to a form suitable for transmission by a radio transmitter 105. The parity bits are produced in a parity generator 106 which produces parity bits for all, or for the most sensitive, groups of speech data being transmitted.

Figure 2:
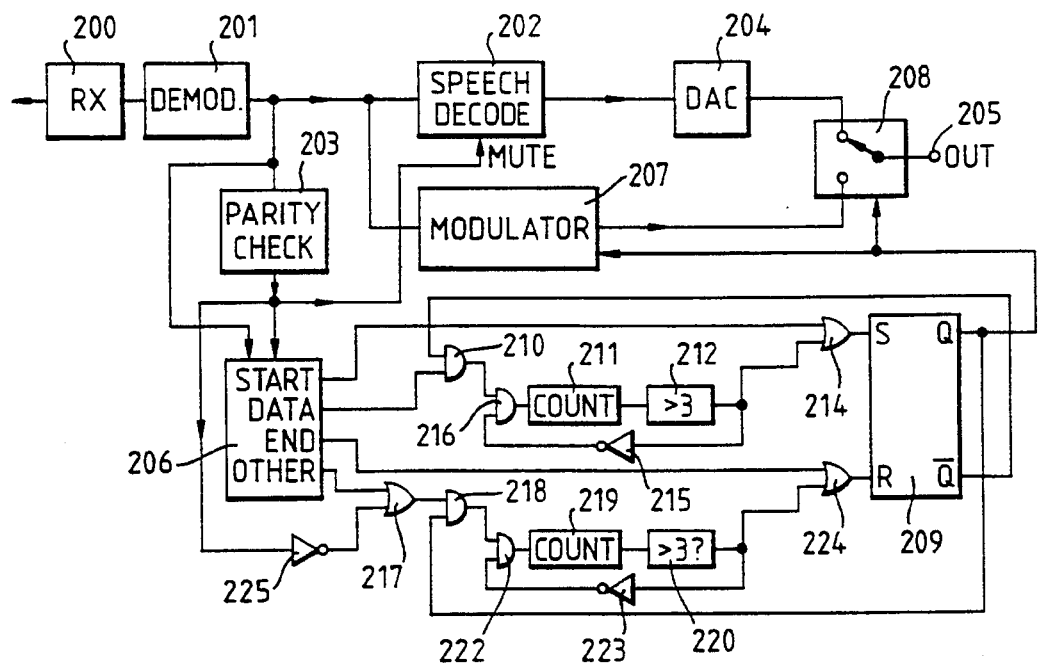
FIG. 2 is a block diagram of a decoding apparatus.

FIG. 2 shows a decoder. Signals are received by a radio receiver 200 and demodulated in a demodulator 201. The digital speech parameters are fed to a speech decoder 202 and also to a parity check unit 203; if more than a predetermined number of parity bits is incorrect, a "parity fail" signal is produced and serves to mute the speech decoder 202. The decoded output is converted to analogue form by a converter 204 and supplied to an output 205.

Returning now to FIG. 1, the bit rate reduction in the speech coder 102 is achieved by exploiting the inherent redundancy of a speech signal. Such coders generally are optimized for the known characteristics of speech signals and consequently perform badly if one attempts to use them to process voice-band data such as modulated signals of the type used for group III facsimile transmission. In order to enable the encoder to handle such data signals, a detector 107 monitors the input 100 to identify signals of this kind. In this embodiment the detector 107 serves to detect the presence of phase-shift-keyed (PSK) modulated signals according to CCITT standard V. 27. In the event of recognition by the detector 107 a V. 27 demodulator 108 is enabled; the demodulated data are forwarded to the formatting unit 103 in place of the data from the speech coder 102, via a changeover switch 109. The data are then formatted, in any desired manner, into the same frame structure, subject however to the constraint that the parity bits are generated from the data bits having the same positions in the frame and occupy the same positions in the frame as before. A modulation codeword indicating the type of modulation received is inserted by a unit 111 into the frame at a position designated for this purpose. It is envisaged that the first such frame will carry a distinct ("START V. 27 DATA") codeword from the following frames (having a "V. 27 DATA" codeword).

Moreover, the parity bits are inverted (shown as performed by an exclusive-or gate 110 supplied with an enable signal from the detector 107). The modulator 104 and transmitter 105 operate in the same manner as in the case of speech transmission. In the event that V. 27 modulation ceases to be recognized by the detector 107, then the unit 111 inserts an additional code to indicate "END OF DATA" in the last data frame: to permit this, release of the enabling signal from the detector 107 to the switch 109 and exclusive-or gate 110 is delayed by hold circuit 112.

Turning again to FIG. 2, assume first that speech is being received and that the transmission switches to V. 27 data. Owing to the parity reversal, the parity check unit 203 produces a parity fail signal. As well as muting the speech decoder 202 this signal also enables a comparator unit 206 which extracts from the received data frame the "modulation codeword" bits and compares these with stored codewords, namely those identifying the types of voice-band data modulation that the apparatus is designed to handle. Assuming that a codeword "Start V. 27 Data" corresponding to the commencement of V. 27 modulation is recognized, the comparator produces an enable signal which enables operation of a V. 27 modulator 207. The latter receives the received data from the demodulator 201 and produces a modulated output which is routed to the output 205 via a changeover switch 208.

The enable signal from the comparator 206 is shown as being latched by a latch 209. Upon cessation of data the "END DATA" code is recognized by the comparator 206; the latch is released and the apparatus reverts to speech operation.

In order to obtain satisfactory operation in the presence of transmission errors, provision is made for conditions which may occur as a result:

(a) if a parity fail signal occurs during the speech mode of operation (i.e. when the latch 209 is not set) and a START or END code is not recognized by the comparator 206 this means either that speech is being received with errors or that data are being received with the receiver in speech mode (e.g. because the "START DATA" code has been missed). If a "DATA" code is recognized this condition is recognized by an and-gate 210 and increments a data frame counter 211. If this condition occurs four times in succession a comparator 212 sets the latch 209 (via an or-gate 214) to switch to data reception and incrementing of the counter is inhibited by an inverter 215 and an and-gate 216;

(b) if a parity fail does not occur (inverter 225)—or occurs without recognition of a valid codeword ("OTHER" output from the comparator 206)—when the latch 209 is set this means either that data are being received with errors or that speech is being received when the receiver is in the data mode of operation (e.g. because the "END DATA" code has been missed). This condition is recognized by an or-gate 217 and and-gate 218. A bad frame counter 219 (with associated ">3" comparator 220, an and-gate 222, inverter 223 and or-gate 224) operates in like manner to the counter 211 so that four occurrences of such a frame results in resetting of the latch 209 and reversion to speech decoding.

In the interests of clarity, circuitry for resetting the counters 211, 219 is not shown. The data frame counter is reset to zero upon resetting of the latch 209 or, if the latter is already reset, for any frame for which a "START DATA" OR "DATA" code is nor recognized by the comparator 206. The bad frame counter 219 is reset upon setting of the latch 209, or, if the latter is already set, for any frame for which a "START DATA" or "DATA" code is recognized by the comparator 206.

Naturally (as with the apparatus of FIG. 1) components 206–225 could be duplicated for FSK or other desired modulation.

I claim:

1. An audio-frequency coding apparatus comprising:
    (a) an input for receiving audio-frequency signals;
    (b) a speech coder for coding the received signals into digital form;
    (c) a demodulator for demodulating the received signals, in accordance with a predetermined modulation scheme;
    (d) a recognizer operable to place the apparatus in a data or speech mode dependent on the presence or absence respectively of signals according to the predetermined modulation scheme;
    (e) means for formatting signals from, in the data mode, the demodulator and from, in the speech mode, the speech coder, into a common framing structure;
    (f) a parity generator responsive to a plurality of predetermined bit positions within the framing structure to generate parity bits and to insert these in predetermined positions within the frame structure, the sense of the parity bits when in the data mode being the reverse of that in the speech mode, and
    (g) insertion means for generating a codeword indicative of data transmission and inserting this into a predetermined position within the frame structure.

2. An apparatus according to claim 1 in which the insertion means is operable to insert, in a group of consecutive frames containing data from the demodulator:
    (i) in the first frame, a first data signal type codeword;
    (ii) in the last frame, a second codeword distinct from the first; and
    (iii) in any intervening frames, a third codeword distinct from the first and second.

3. An apparatus according to claim 2 including a second recogniser for recognising a second modulation scheme, arranged to enable a second demodulator, the codeword or words identifying the type of modulation.

4. An apparatus according to claim 1 including a second recogniser for recognising a second modulation scheme, arranged to enable a second demodulator, the data signal type codeword or words identifying the type of modulation.

5. A decoding apparatus for decoding digital signals, the signals comprising data frames formatted according to a predetermined framing structure, said frames including frames containing encoded speech and frames containing a further type of data, the further type of data having been demodulated from an original signal modulated in accordance with a predetermined modulation scheme, each data frame including:
    a first predetermined position within the frame for carrying a codeword to indicate the type of signal data being sent; and
    one or more further predetermined positions within the frame reserved for inclusion of parity bits, the sense of which, when included within a frame conveying encoded speech signals, is the reverse of that for parity bits included within a frame conveying the further type of data;
    the apparatus comprising:
    (a) means for receiving said frames of digital signals and for performing parity checks thereon to produce, for each frame, a parity indicating signal indicative of a first sense or a second sense of parity;
    (b) control means connected to receive the parity indicating signals and the codewords contained in the received frames, said control means being responsive to a first predetermined combination of parity indicating signal and codeword to switch the apparatus into a data mode and being responsive to a second predetermined combination of parity indicating signal and codeword to switch the apparatus into a speech mode;
    (c) modulation means operable in the data mode to modulate the received signals in accordance with the predetermined modulation scheme and to provide a modulated signal to the output of the apparatus; and
    (d) speech decoding means operable in the speech mode to decode the received signals to provide a speech signal to the said output.

6. A decoding apparatus according to claim 5 including recognition means for recognising codewords, in which the control means is responsive to the occurrence of a parity indicating signal indicative of a first sense of parity and of a first data signal type codeword to switch the apparatus into the data mode and to the occurrence of a parity indicating signal indicative of said first sense of parity and of a second data terminating codeword to switch the apparatus into the speech mode.

7. A decoding apparatus according to claim 6 including a second modulator operable in the data mode to modulate the received signals to provide a modulated signal, using a second type of modulation, to the output of the apparatus, the control means being responsive to codewords of a first set or a second set to select the modulator to be used.

8. A decoding apparatus according to claim 7 in which the control means is additionally responsive:
   (i) when in the speech mode, to the repeated occurrence, on a predetermined number of consecutive frames, of a parity indicating signal indicative of a first sense of parity and of a third intervening data frame codeword to switch the apparatus into the data mode; and
   (ii) when in the data mode, to the repeated absence, on a predetermined number of consecutive frames, of a parity indicating signal indicative of a first sense of parity or the repeated occurrence, on a predetermined number of consecutive frames, of a parity indicating signal indicative of a second sense of parity unaccompanied by a recognisable codeword, to switch the apparatus into the speech mode.

9. A decoding apparatus according to claim 5 including a second modulator operable in the data mode to modulate the received signals to provide a modulated signal, using a second type of modulation, to the output of the apparatus, the control means being responsive to codewords of a first set or a second set to select the modulator to be used.

10. A decoding apparatus according to claim 5 in which the control means includes codeword recognition means, said codeword recognition means being enabled only upon receipt of a parity indicating signal indicative of a first sense of parity.

11. A decoding apparatus according to claim 10 including a second modulator operable in the data mode to modulate the received signals to provide a modulated signal, using a second type of modulation, to the output of the apparatus, the control means being responsive to codewords of a first set or a second set to select the modulator to be used.

12. A decoding apparatus according to claim 5 in which the control means is arranged to recognise further combinations of parity indicating signal and codeword other than said first and second predetermined combinations, and includes timer means operable upon receipt of such other combinations to initiate switching between modes only if the combination persists for a predetermined number of consecutive frames.

* * * * *